US006597961B1

(12) United States Patent
Cooke

(10) Patent No.: US 6,597,961 B1
(45) Date of Patent: Jul. 22, 2003

(54) SYSTEM AND METHOD FOR CONCEALING ERRORS IN AN AUDIO TRANSMISSION

(75) Inventor: Kenneth E. Cooke, Seattle, WA (US)

(73) Assignee: RealNetworks, Inc., Seattle, WA (US)

( * ) Notice: Subject to any disclaimer, the term of this patent is extended or adjusted under 35 U.S.C. 154(b) by 0 days.

(21) Appl. No.: 09/300,797

(22) Filed: Apr. 27, 1999

(51) Int. Cl.[7] .......................... G06F 17/00; G06F 11/00

(52) U.S. Cl. .......................................... 700/94; 714/746

(58) Field of Search ................................ 704/500, 265, 704/228, 226; 714/747, 746, 758, 776; 700/94

(56) References Cited

U.S. PATENT DOCUMENTS 4,718,067 A 1/1988 Peters
4,809,274 A 2/1989 Walker et al.
5,148,487 A * 9/1992 Nagai et al.
5,572,622 A 11/1996 Wigren et al.
5,657,454 A 8/1997 Benbassat et al.
5,673,363 A * 9/1997 Jeon et al.
5,740,187 A * 4/1998 Tanaka
5,764,773 A 6/1998 Nishiura
5,805,469 A * 9/1998 Okamoto et al.
5,890,112 A 3/1999 Kitabatake

* cited by examiner

*Primary Examiner*—Forester W. Isen
*Assistant Examiner*—Brian Tyrone Pendleton
(74) *Attorney, Agent, or Firm*—Steven C. Stewart; RealNetworks, Inc.

(57) ABSTRACT

A system and method of the present invention conceal errors caused by lost audio in an audio transmission. A frame error detector detects audio data lost in an audio data transmission. An audio decoder generates frequency and time domain data from received audio data. A transient detector detects the presence of a transient audio signal in the received audio data. A frame synthesizer interpolates frequency domain data to generate synthetic audio data to construct audio data in place of the lost audio data.

18 Claims, 10 Drawing Sheets

SYSTEM AND METHOD FOR CONCEALING ERRORS IN AN AUDIO TRANSMISSION

BACKGROUND OF THE INVENTION

1. Field of the Invention

This invention relates to the processing of audio signal data. More specifically, the invention provides a system and method for intelligently synthesizing audio data to conceal errors detected in a received audio signal.

2. Description of the Related Art

Growing numbers of high-quality digital audio reproduction systems have heightened the demand for the transmission of digital audio data. Much of that demand is based on a desire to hear a live playback of an audio selection, such as music or broadcasts of news or sporting events.

Digital audio broadcast systems now exist which are capable of streaming digital audio data to audio receiving systems for immediate playback. Most communication networks, however, cannot guarantee that all audio information that is transmitted by an audio transmission system will be received error-free by all receiving systems.

One example of such a communication network is the Internet. Audio data streaming systems now exist which transmit audio data in packets over the Internet, with the packets being received by audio playing applications for immediate and continuous playback. While the Internet is reasonably reliable for successfully transmitting data from a sending system to a receiving system, the transmission is not necessarily guaranteed. In the case of UDP protocol transmission, the packets may arrive out of order, late or not at all. Connections, such as UDP connections, routinely drop or lose packets. Audio data packets are no exception.

Some attempts have been made to allow audio receiving systems to conceal the effects of lost audio packets. Early techniques merely muted lost packets, that is, substituted silence for lost audio data. Other techniques simply replicate the last successfully received packet to take the place of a lost packet. This results in the unpleasant experience of the same sequence of audio information being played twice, or sometimes over and over again in the case when a series of audio packets is lost.

An improved, but still dissatisfactory technique is disclosed in U.S. Pat. No. 5,673,363 to Jeon et al. for an Error Concealment Method and Apparatus of Audio Signals. That patent discloses a technique of reconstructing a frame of lost audio information by applying predetermined weight values to frequency coefficients of adjacent frames which do not have errors. The problem with that technique and other existing techniques is that it ignores important signal characteristics surrounding the lost audio data. For example, the technique will simply use the frequency coefficients of a neighboring frame to reconstruct a lost frame, even though those frequency coefficients may represent a sharp change or attack in an audio signal, with the result being an extremely unpleasant and disruptive repeat of an audio attack during playback.

There is now a tremendous need for a system and method capable of discriminating among signal characteristics used to reconstruct lost audio data.

SUMMARY OF THE INVENTION

One embodiment of the present invention is a method for creating audio signal data representing audio data lost during a transmission. The method comprises the steps: (1) receiving first audio data from an audio transmission; (2) receiving second audio data from an audio transmission; (3) detecting the loss of audio data between said first and second audio data; (4) determining the presence of a transient audio signal in said first audio data; (5) decoding said second audio data to create second frequency domain data; and (6) interpolating synthetic frequency domain data by applying an interpolation weight to samples in said second frequency domain data. In a preferred aspect, the method comprises the further step of decoding said synthetic frequency domain data to generate time domain data for audio reproduction. In another aspect, the method comprises determining the presence of a transient audio signal in said second audio data; decoding said first audio data to create first frequency domain data; and nterpolating synthetic frequency domain data by applying an interpolation weight to samples in said first and second frequency domain data.

In another embodiment, the present invention is a system for concealing errors during audio playback caused by lost audio data. The system comprises: (1) a buffer storing first and second audio data; (2) an audio loss detector detecting an absence of audio data expected between said first and second audio data; (3) an audio decoder generating second frequency domain data from said second audio data; (4) a transient detector for detecting the presence of a transient audio signal in said first audio data; and (5) a frame synthesizer interpolating synthetic audio data to fill said absence by applying an interpolation weight to said second frequency domain data.

In a further embodiment, the present invention is a system for concealing errors caused by lost audio data in an audio transmission. The system comprises (1) means for receiving audio data; (2) means for detecting lost audio data; (3) means for decoding received audio data to generate frequency domain data; (4) means for detecting transient audio signals in received audio data; and (5) means for synthesizing audio frame data from frequency domain data.

DETAILED DESCRIPTION OF THE PREFERRED EMBODIMENT

Figure 1:
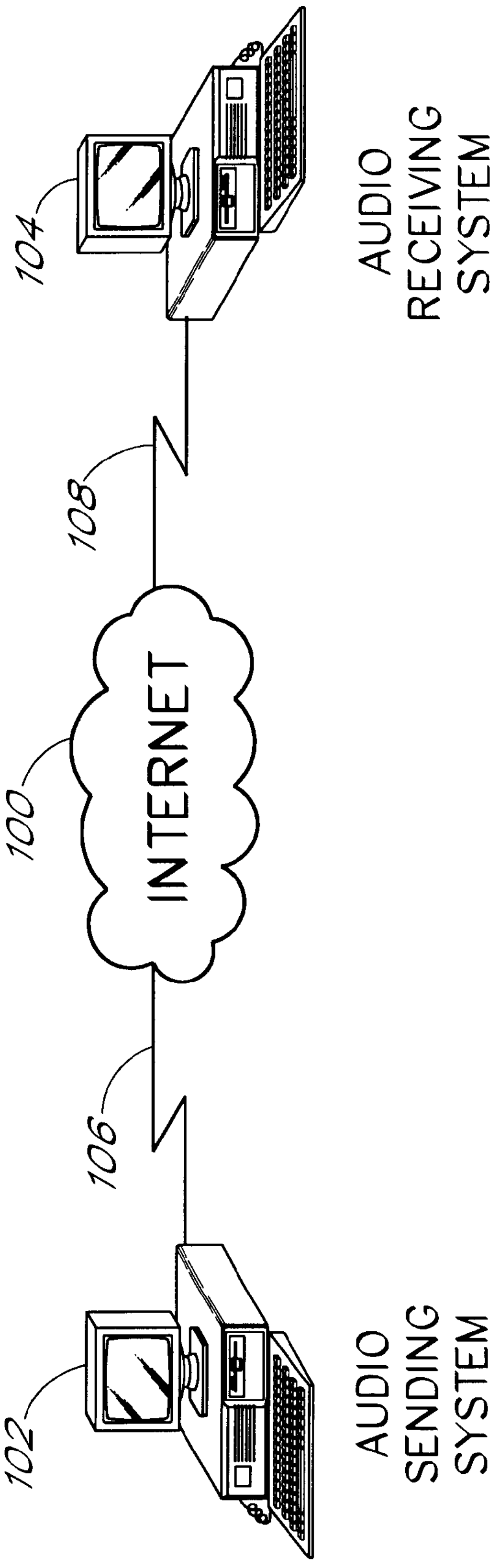
FIG. 1 illustrates a high level diagram of an audio transmission system supporting a system and method in one embodiment of the present invention for concealing errors resulting from lost audio data.

FIG. 1 illustrates a high level diagram of an audio transmission system supporting a system and method in one embodiment of the present invention for concealing errors resulting from lost audio data. The system includes a network 100, a sending system 102, and a receiving system 104. The sending system 102 and the receiving system 104 are connected to the network 100 via communication links 106, 108.

The sending system 102 and the receiving system 104 may each, in one embodiment, be any one of a number of different types of computing devices, including a desktop, portable or hand-held computer, or a network computer using one or more microprocessors, such as a Pentium processor, a Pentium II processor, a Pentium Pro processor, a Pentium III processor, an xx86 processor, an 8051 processor, a MIPS processor, a Power PC processor, or an ALPHA processor.

The sending system 102 and the receiving system 104 preferably include computer-readable storage media, such as standard hard disk drives and/or RAM (random access memory) possibly amounting to 8 MB or more. The sending system 102 and the receiving system 104 each also comprise a data communication device, such as, for example, a 56 kbps modem or network interface card.

The network 100 may include any type of electronically connected group of computers including, for example, the following networks: Internet, intranet, local area networks (LAN) or wide area networks (WAN). In addition, the connectivity to the network may be, for example, ethernet (IEE 802.3), token ring (IEEE802.5), fiber distributed data link interface (FDDI) or asynchronise transfer mode (ATM). The network 100 can include any communication link between a sending system and a receiving system. As used herein, an Internet includes network variations such as public Internet, a private Internet, a secure Internet, a private network, a public network, a value-added network, and the like.

Figure 2:
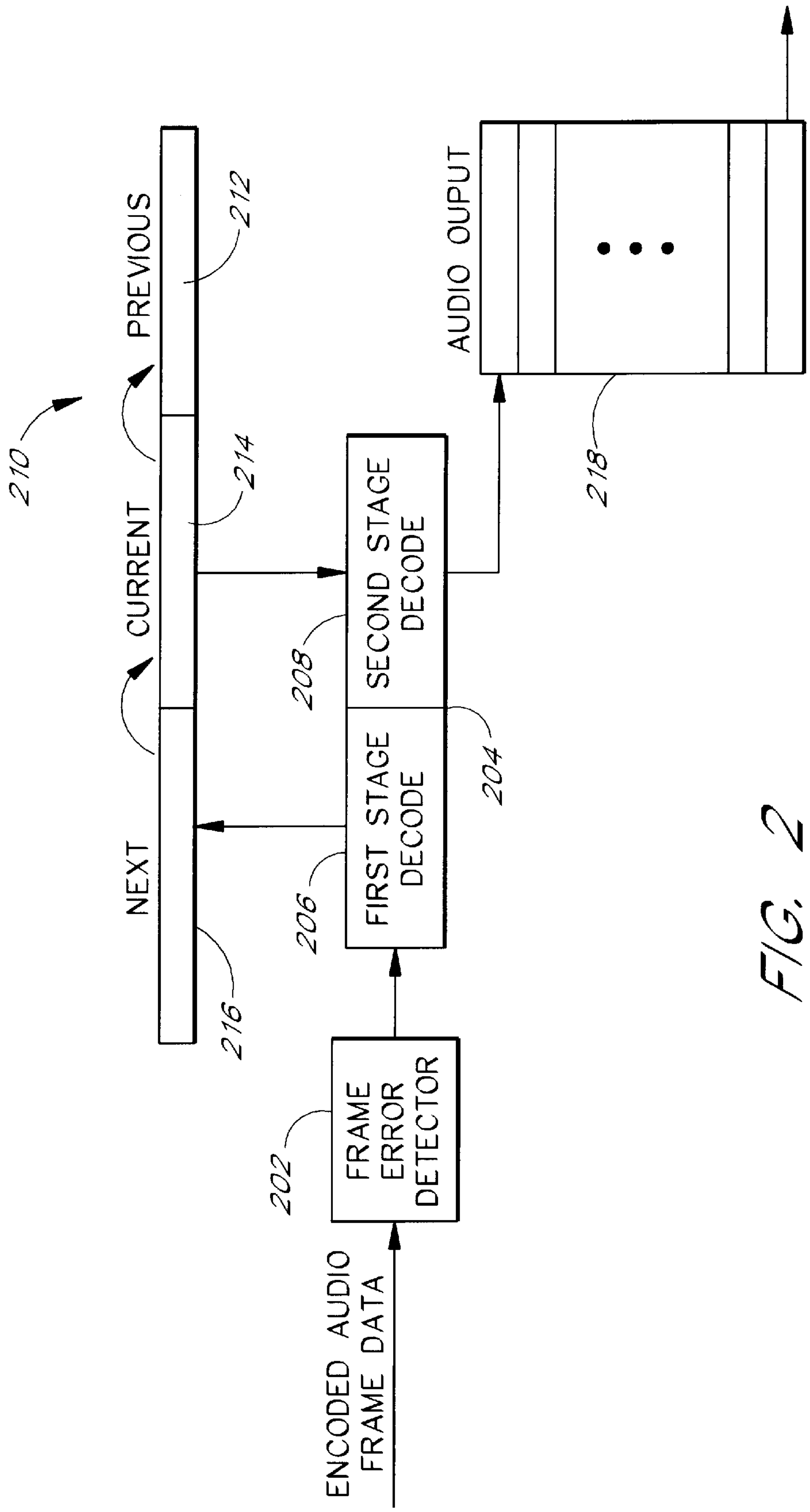
FIG. 2 illustrates components of an audio receiving system for detecting errors in the receipt of audio frames and for reconstructing audio data in the erroneously received or lost audio frames.

FIG. 2 illustrates components of an audio receiving system for detecting errors in the receipt of audio frames and for reconstructing audio data in the erroneously received or lost audio frames. A frame error detector module 202 detects when an audio data packet is received in error or is completely missing in the transmission of an audio signal. As used herein, the word module refers to logic embodied in hardware or firmware, or to a collection of software instructions, possibly having entry and exit points, written in a programming language, such as, for example, C++. A software module may be compiled and linked into an executable program, or installed in a dynamic link library, or may be written in an interpretive language such as BASIC. It will be appreciated that software modules may be callable from other modules, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays. The modules described herein are preferably implemented as software modules, but could be represented in hardware or firmware.

In the case of an audio receiving system that receives audio over the Internet, in particular when using UDP protocol, the frame error detector 202 detects missing packets by deeming lost those packets that do not arrive within a predetermined amount of time.

In another embodiment of the present invention, the frame error detector 202 uses a checksum-based method, a CRC (cyclic redundancy check) method, or other error detecting coding method, to determine that there were errors in the transmission of a packet and that it was not received entirely intact. As will be appreciated by those of ordinary skill in the art, many techniques exist for determining errors in received packets or for determining that packets are missing from a sequence of received packets, and the present invention is not limited by any such techniques.

A decoder module 204 of the audio receiving system includes a first decoding stage module 206 and a second decoding stage module 208. The first decoding stage module 206 generally unpacks audio frame data and recreates transform coefficients in the frequency domain. The second decoding stage module 208, in one embodiment, applies an inverse transform to obtain audio samples in a time domain. Such functions are common to known audio codecs.

An audio frame buffer 210 includes a previous frame buffer 212, a current frame buffer 214, and a next frame buffer 216. As the audio receiving system processes audio frames, audio data in the current frame buffer 214 are shifted into the previous frame buffer 212, audio data in the next frame buffer 216 are shifted into the current frame buffer 214, and newly decoded transform coefficients (frequency domain samples) are placed into the next frame buffer 216. Transform coefficient data from the current frame buffer 214 are processed by the second decoding stage module 208 to obtain PCM (pulse code modulated) data which are placed into an audio output buffer 218. Data from the audio output buffer 218 are sent, in first-in, first-out order, to audio reproduction equipment, such as a sound card.

Figure 3:
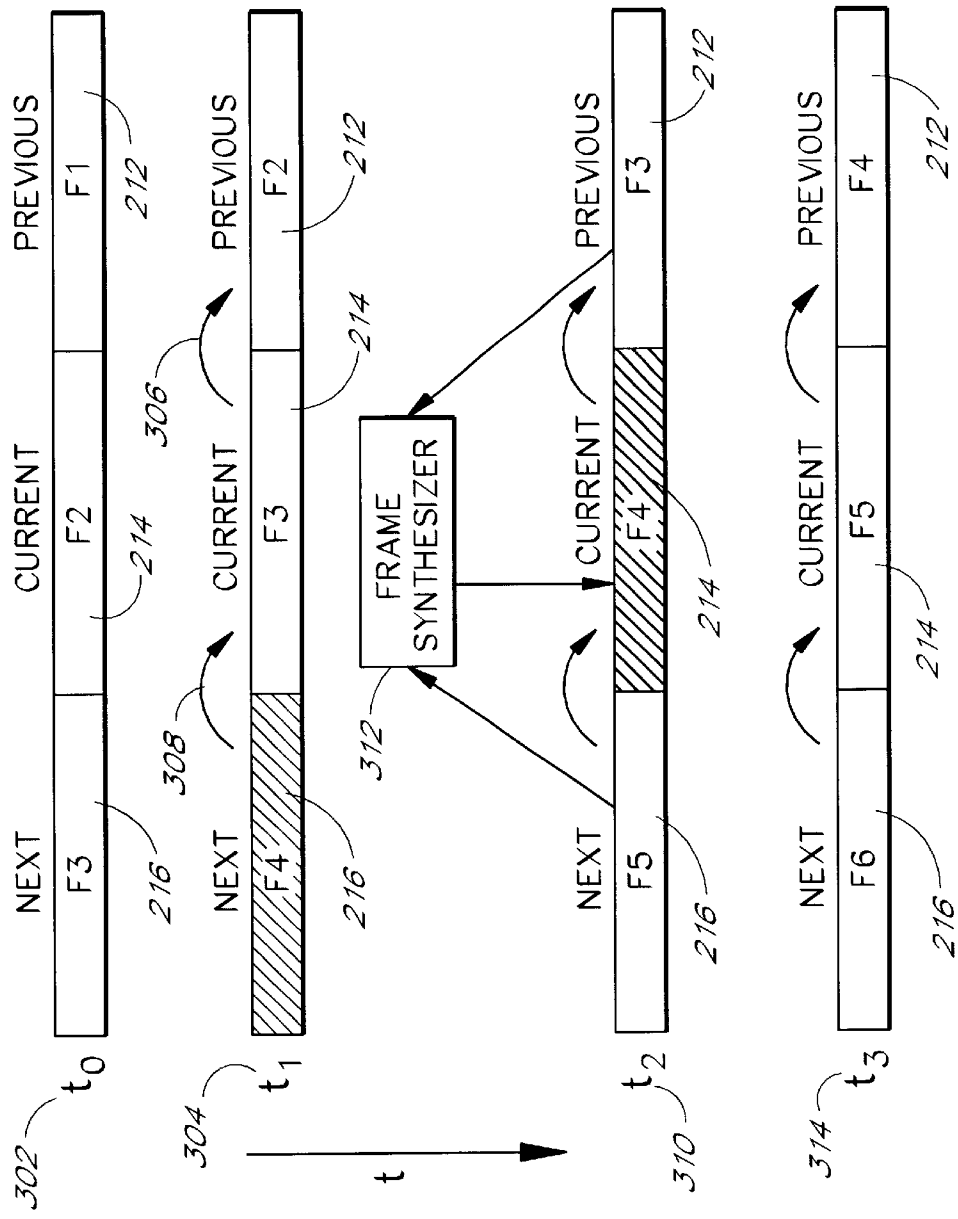
FIG. 3 illustrates the shifting of audio frame data through the audio frame buffer to reconstruct lost audio frame data.

FIG. 3 illustrates the shifting of audio frame data through the audio frame buffer 210 to reconstruct lost audio frame data. At a time $t_0$ 302, the previous frame buffer 212 includes successfully received audio frame data, as does the current frame buffer 214 and the next frame buffer 216. At a time $t_1$ 304, the successfully received audio frame data in the current frame buffer 214 are sent immediately to the second decoding stage module 208 for time domain processing and are also shifted 306 into the previous frame buffer 212. Also, at the time $t_1$, the successfully received audio frame data in the next frame buffer 216 are shifted 308 into the current frame buffer 214, and data representing a lost audio frame are copied into the next frame buffer 216.

At a time $t_2$ 310, the data in the current frame buffer 214 and in the next frame buffer 216 are again shifted, and a new audio frame of successfully received data is copied into the next frame buffer 216. Thus, data representing a successfully received audio frame reside in both the previous frame buffer 212 and the next frame buffer 216, while the data representing the lost frame reside in the current frame buffer 214.

A frame synthesizer module 312 examines characteristics of the audio frame data in both the previous frame buffer 212 and the next frame buffer 216 to reconstruct audio frame data for the lost frame. The frame synthesizer 312 places the reconstructed audio data for the lost frame in the current frame buffer 214. The operation of the frame synthesizer 312 will be described in more detail below.

At a time $t_3$ 314, the reconstructed audio data residing in the current frame buffer 214 are shifted into the previous frame buffer 212. Also, the reconstructed audio frame data in the current frame buffer 214 are processed by the second decoding stage module 208 to generate time domain samples which are placed in the audio output buffer 218. Also, at the time $t_3$, successfully received audio frame data are placed into the next frame buffer 216, the contents of which have been shifted into the current frame buffer 214.

Figure 4:
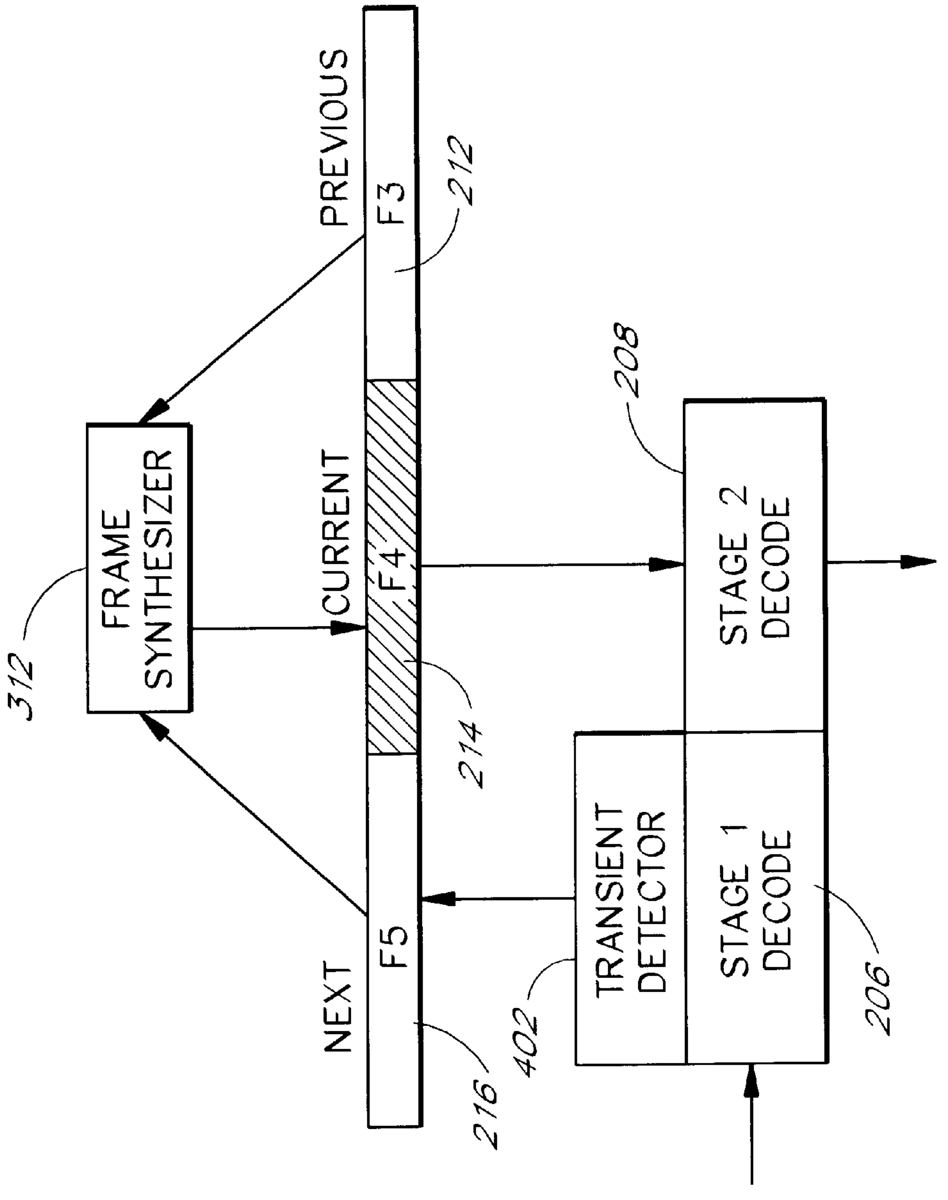
FIG. 4 illustrates components of an audio receiving system in accordance with an embodiment of the present invention for detecting transient audio signals and using that detection to more intelligently reconstruct lost audio frame data.

FIG. 4 illustrates components of an audio receiving system in accordance with an embodiment of the present invention for detecting transient audio signals and using that detection to more intelligently reconstruct lost audio frame data. As audio frame data are input to the first decoding stage module 206, a transient detector module 402 scans the audio data in the incoming frame to determine the presence of transient audio signals. Generally, the transient detector 402, upon detecting the presence of transient audio signals in a frame of audio data, sets a transient flag associated with the particular frame which indicates that the frame includes a transient audio signal. The frame synthesizer 312, in a method described more fully below, uses the knowledge that either the previous frame buffer 212 or the next frame buffer 216 includes a transient to influence the reconstruction of one or more lost audio frames.

Figure 5:
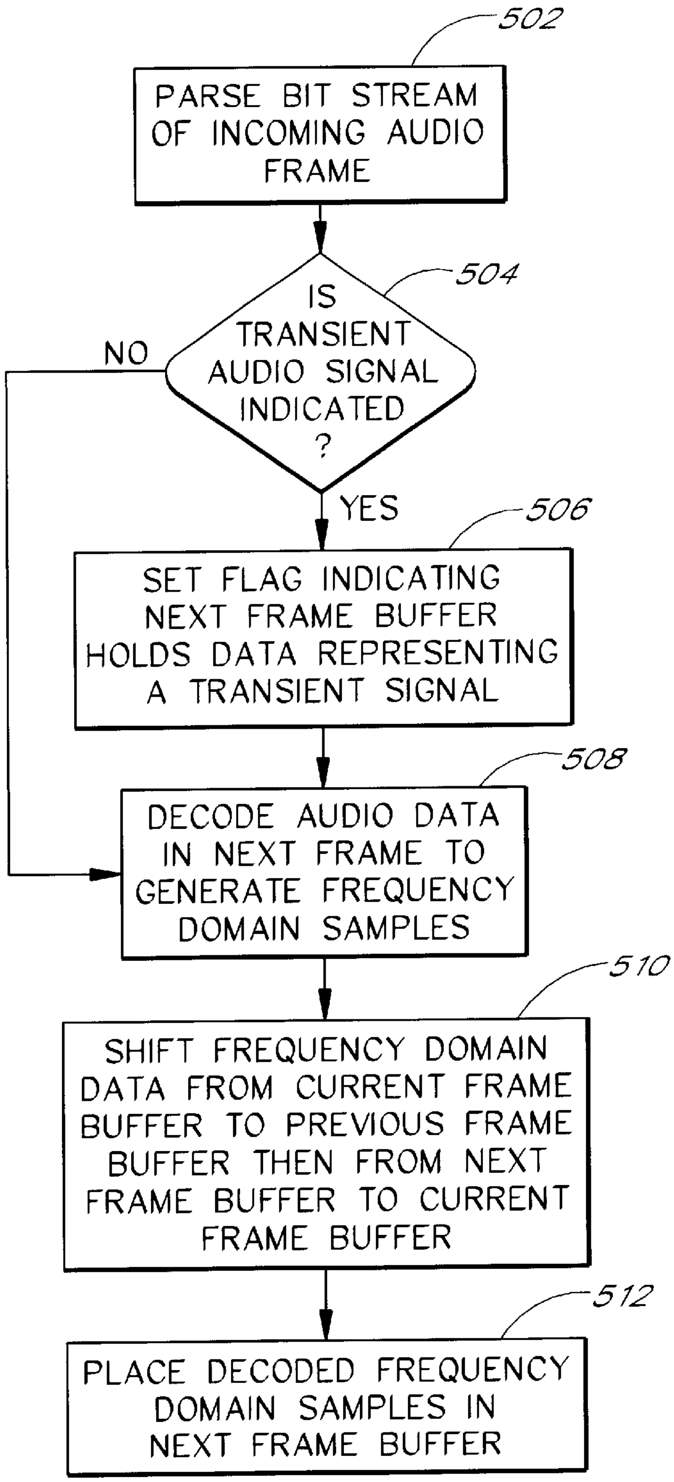
FIG. 5 illustrates steps performed by the transient detector, in one embodiment of the present invention, to detect the presence of a transient audio signal in a frame of audio data.

FIG. 5 illustrates steps performed by the transient detector, in one embodiment of the present invention, to detect the presence of a transient audio signal in a frame of audio data. It will be appreciated by those of ordinary skill in the art that the compressed audio data generated by many existing audio codecs (coder/decoders) includes data indicating the presence of a transient audio signal. This generally results from the fact that audio codecs takes special action when, in encoding an audio stream, the codec encounters a transient audio signal. Some existing codecs alter the transform size applied during encoding when they encounter a transient audio signal. Thus, for example, a Dolby AC-3 codec switches to a one-half size transform to encode transient audio signals, some MPEG-Layer 3 codecs switch to a one-third size transform, and a MPEG-AAC codec switches to a one-eighth size transform to encode transient audio signals. Other audio codecs change the type of transform used when encoding transient audio signals. For example, a Lucent PAC codec switches from a DCT to a wavelet transform to encode transient audio signals.

Referring to FIG. 5, in a first step 502, the transient detector parses a bit stream representing an incoming audio frame. The precise nature of the parsing will, as appreciated by those of ordinary skill, differ depending upon the format of the compressed audio data generated by the audio codec which encoded the audio frame. As an example, however, the parsing process may be designed to traverse a bit stream having a particular structure. Thus, the transient detector may skip a certain number of bits to arrive at a particular offset from the beginning of the bit stream and, at that location, extract a certain number of bits, or bit field, representing the transform or a change in transforms used to encode the audio frame. Upon detecting, for example, that the bit field matches a predetermined value associated with a transform used by the audio codec to encode transient audio signals, the transient detector 402 may determine that the incoming audio frame includes the transient audio signal.

In that or a like manner, the transient detector, in a step 504, determines whether the compressed audio data of the incoming audio frame indicates that the frame includes a transient audio signal. If so, then, in a step 506, the transient detector sets a transient flag indicating that the next frame buffer 216 holds audio frame data which includes a transient signal. Once the transient flag is set in the step 506, or if, in the step 504, no indication of a transient audio signal was present, then, in a step 508, the first decoding stage module 206 decodes audio data in the incoming frame to generate frequency domain samples. In a further step 510, the frequency domain data from the current frame buffer 214 are shifted into the previous frame buffer 212, and the audio frame data in the next frame buffer 216 are shifted into the current frame buffer 214. In a step 512, the newly decoded frequency domain samples are placed in the next frame buffer 216.

Figure 6:
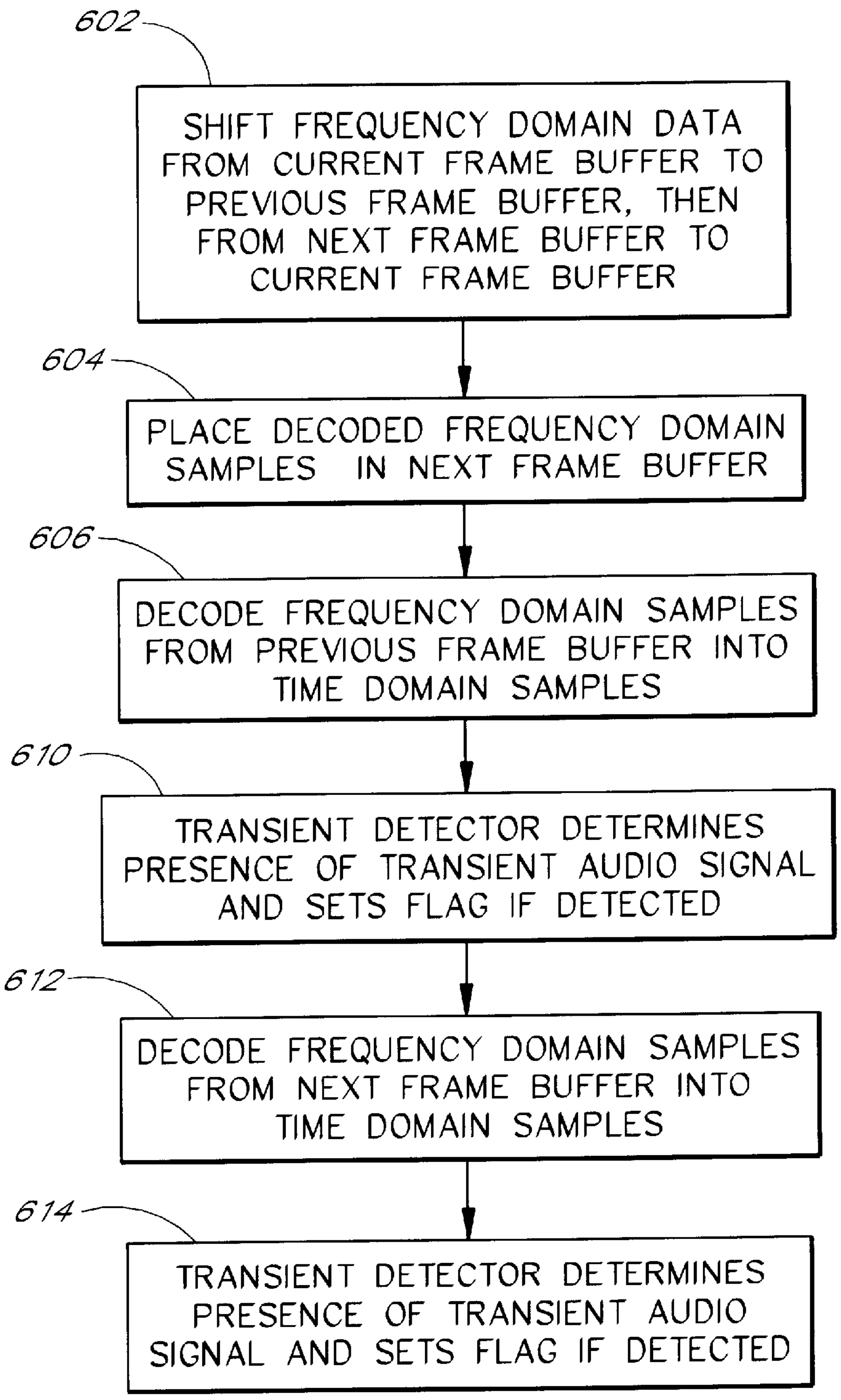
FIG. 6 illustrates steps in an alternative embodiment of the present invention for determining the presence of transient audio signals in audio frame data.

FIG. 6 illustrates steps in an alternative embodiment of the present invention for determining the presence of transient audio signals in audio frame data. In a first step 602, frequency domain data samples are transferred from the current frame buffer 214 to the previous frame buffer 212, and the frequency domain data samples from the next frame buffer 216 are shifted into the current frame buffer 214. In a next step 604, the newly decoded frequency domain samples are placed in the next frame buffer 216.

Figure 7:
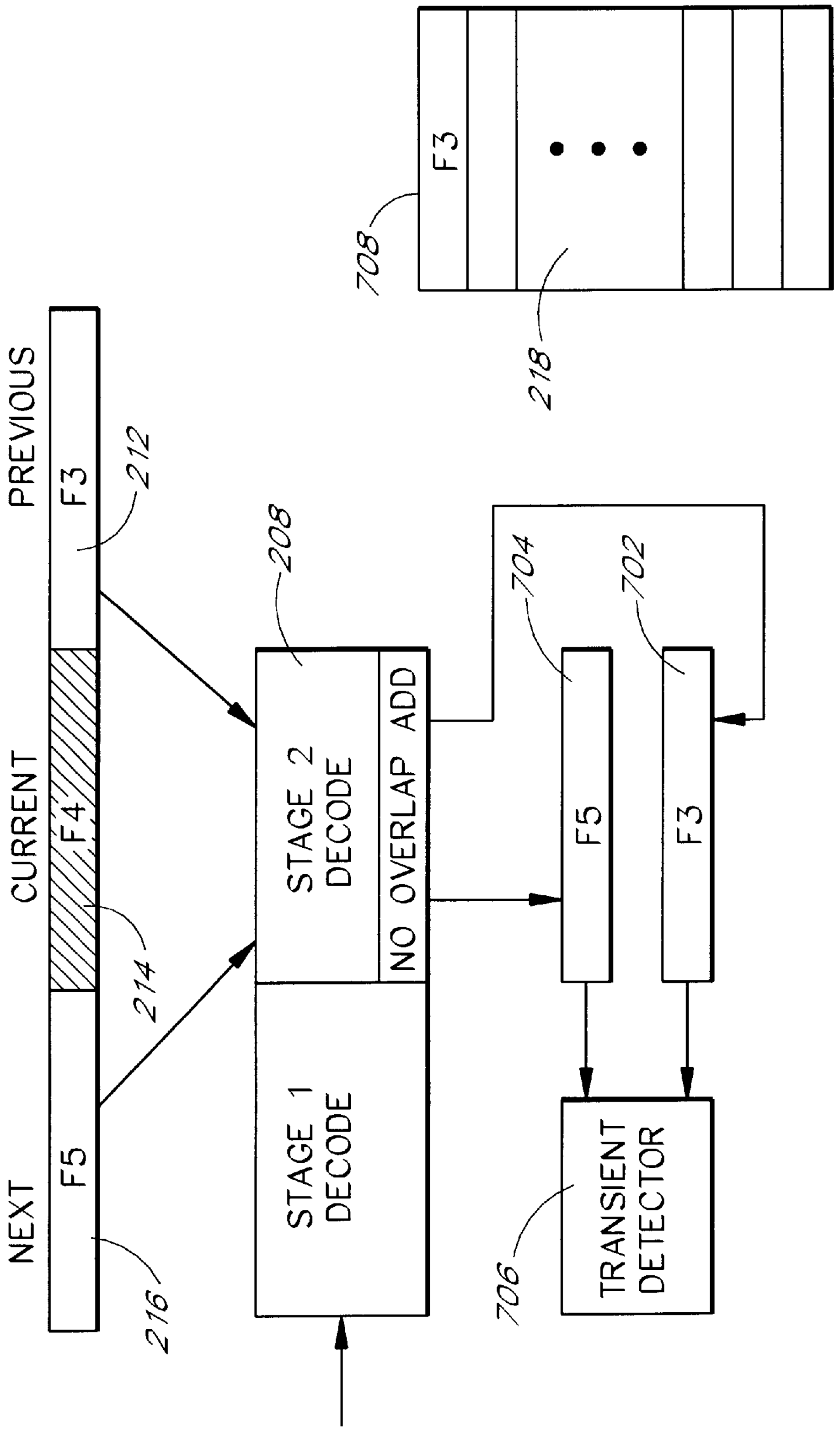
FIG. 7 illustrates a block diagram of components in one embodiment of the present invention for detecting the presence of transient signals in decoded audio data.

In a step 606, the frequency domain samples from the previous frame buffer 212 are processed by the second decoding stage module 208 to generate time domain samples 702 (see FIG. 7). FIG. 7 illustrates a block diagram of components in one embodiment of the present invention for detecting the presence of transient signals in decoded audio data. It will be appreciated by those of ordinary skill, that some existing codecs encode audio data using lapped transforms. In decoding such data, overlap add operations are commonly performed. In one embodiment of the present invention, the decoding of the frequency domain samples from the previous frame buffer 212 is performed by the second decoding stage module 208 excluding any overlap add operation.

In a next step 610, the transient detector determines the presence of a transient audio signal and sets a transient flag associated with the audio frame data in the previous frame buffer 212 if a transient audio signal is detected.

Figure 8:
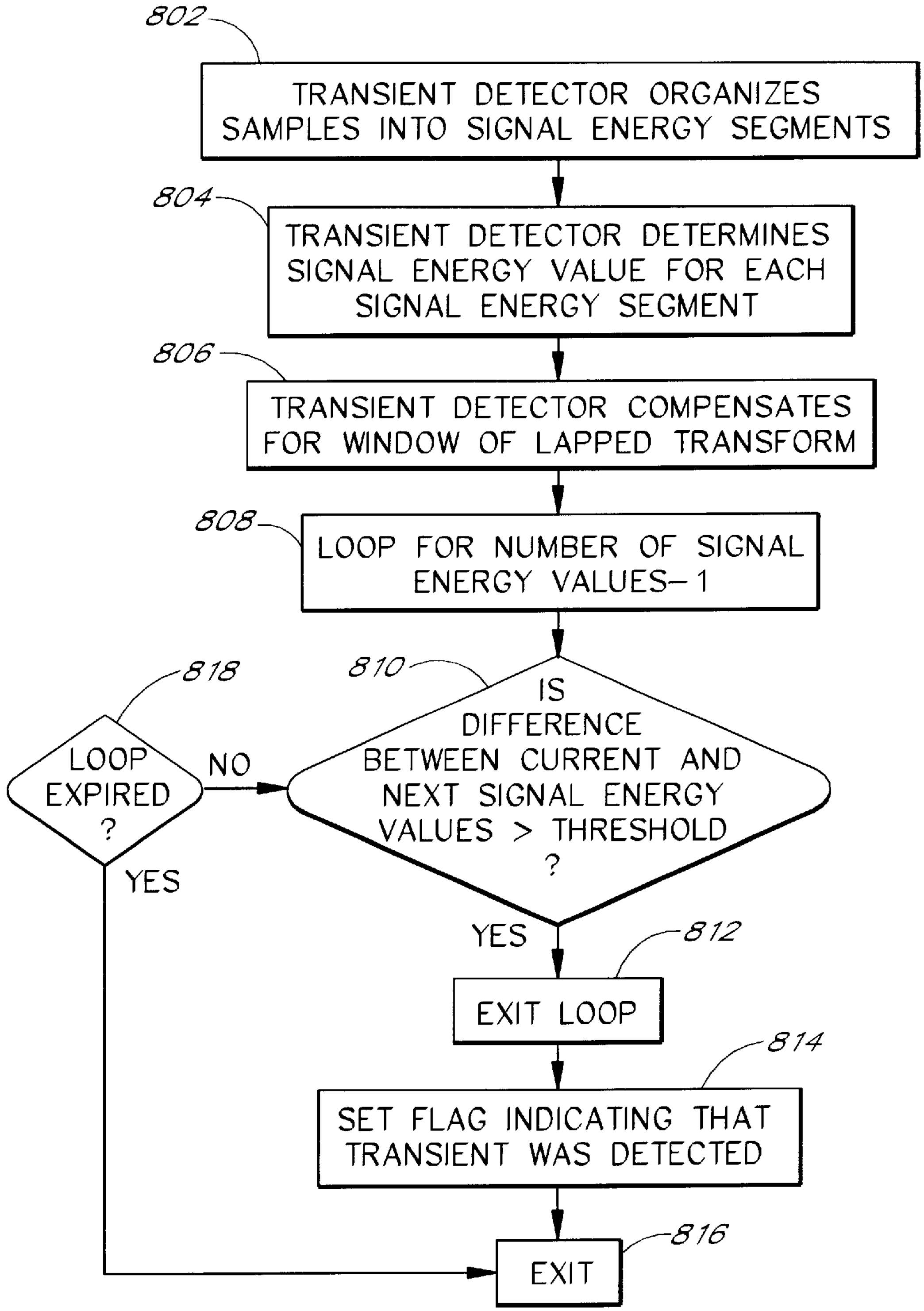
FIG. 8 is a flow chart illustrating steps in accordance with one embodiment of the present invention for examining decoded audio data to determine the presence of transient signals.

FIG. 8 is a flow chart illustrating steps in accordance with one embodiment of the present invention for examining decoded audio data to determine the presence of transient signals. The present invention advantageously examines decoded audio data to determine the presence of a transient audio signal even when no indication of the presence of a transient signal can be discerned from the compressed audio data.

In a step 802, the transient detector organizes time domain samples of the decoded audio frame data 702 into signal energy segments. As one example, when a 1,024 frequency transform is used to encode a frame of audio data, the transient detector breaks up the 1,024 samples into 16 groups of 64 samples each. Thus, the first 64 samples are placed into a first signal energy segment, the next 64 samples are placed into a second signal energy segment, and so on, until 16 energy segments are formed. It will be appreciated by those of ordinary skill, that smaller transforms may be used and that smaller numbers of samples may be combined into signal energy segments.

In a next step 804, the transient detector determines the signal energy value for each of the signal energy segments. In a preferred embodiment of the present invention, the transient detector computes a sum of squares to derive the signal energy value for each signal energy segment. It will be appreciated that other techniques for deriving signal energy value may be used, and the present invention is not limited by any signal energy calculation.

In a step 806, the transient detector compensates for any window of a lapped transform. It will be appreciated that the signal energy of samples decoded from a lapped transform gradually tapers. Thus, in an amount sufficient to compensate for that tapering of signal energy, the transient detector applies a gradually increasing compensation factor to each of the samples to approximately negate the effects of the tapering caused by the lapped transform window. As will be appreciated, the amount of that factor will depend on the window function used in the transform.

In a step 808, the transient detector enters a loop which may iterate a number of times, up to the number of signal energy values minus one. Within the loop, in a step 810, the transient detector compares the signal energy value for one signal energy segment to the signal energy value for the next signal energy segment. If that comparison, in the step 810, results in a difference value less than a certain threshold, then, the loop iterates by advancing to the next signal energy segment for comparison to a next adjacent signal energy segment, and processing resumes again in the step 810. If, however, in the step 810, the difference between the current and next signal energy levels is greater than the threshold, then the transient detector determines the presence of a transient audio signal. It will be appreciated that the threshold value is set to an amount which indicates a rapid change in the signal energy which would generally indicate that the frame including the rapid change is probably not a good choice of a frame to use in reconstructing an adjacent or nearby frame of lost audio information. Thus, the present invention may advantageously avoid repeating an attack type "sudden onset" audio signal which may not have been present in the original audio signal. In one embodiment of the present invention, the threshold value is set to twice the size of the smaller of the signal energy values to be compared, and thus the transient signal will be detected when there is at least a 300% change in signal energy level from one signal energy segment to the next. It will be appreciated that the threshold value is one which may be tuned depending on circumstances such as the type of audio signal being decoded.

In the step 810, if the difference in signal energy value between two consecutive signal energy segments is greater than the threshold, then, in a step 812, the loop is exited. In a further step 814, the transient detector sets a transient flag indicating that a transient audio signal was detected for the audio frame examined. In a next step 816, the transient detector terminates.

If the loop defined in the step 808 completes with no transient signal being detected, then, in a step 818, the loop expires and the transient detector terminates in the step 816.

Referring back to FIG. 6, in a further step 612, frequency domain samples from the next frame buffer 216 are decoded by the second decoding stage module 208 into time domain samples 704 (see FIG. 7). Again, if the audio samples were encoded using a lapped transform, then the decoding in step 612 is performed with no overlap add. In a next step 614, the transient detector 706 determines whether a transient audio signal is present in the time domain samples 704 decoded from the next frame buffer 216.

It will be appreciated, that in another embodiment of the present invention, rather than decoding the frequency domain samples from the previous frame buffer as indicated in the step 606, the time domain samples 708 already in the audio output buffer 218 may be input to the transient detector 706 for processing as described in relation to the step 610.

Figure 9:
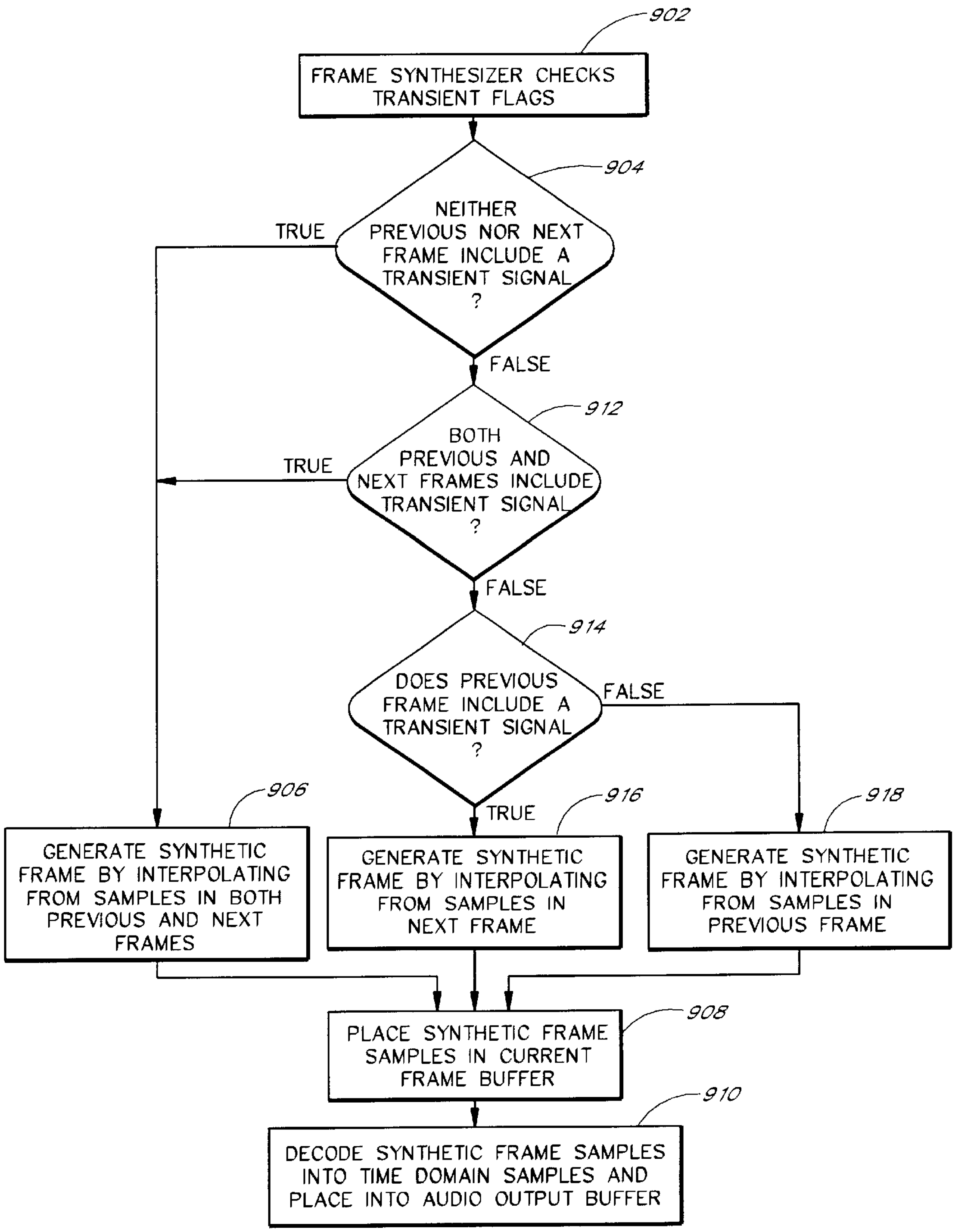
FIG. 9 illustrates steps performed by the frame synthesizer 312 (see FIG. 4) in reconstructing lost audio frame data.

FIG. 9 illustrates steps performed by the frame synthesizer 312 (see FIG. 4) in reconstructing lost audio frame data. In a first step 902, the frame synthesizer checks transient flags associated with the frequency domain samples in the previous frame buffer 212 and in the next frame buffer 216. In one embodiment, the transient flags may be implemented as a three-location array of boolean values, wherein the boolean value in the first location represents the transient flag for the previous frame buffer 212, the boolean value in the second location represents the transient flag for the current frame buffer 214, and the boolean value in the third location represents the transient flag for the next frame buffer 216. In that embodiment, a boolean value of true indicates that the associated frame buffer includes a transient audio signal, and a value of false indicates that the audio data in the associated frame buffer includes no transient audio signal. It will be appreciated by those of ordinary skill that, when the audio data are shifted from one frame buffer to another, the boolean values are shifted from one location to another in a similar manner. In that manner, the presence of a transient signal in an audio frame may be tracked throughout the frame reconstruction process of the present invention.

In a step 904, if the frame synthesizer determines that neither the frequency domain samples in the previous frame buffer 212 nor the frequency domain samples in the next frame buffer 216 include a transient signal, then, in a step 906, the frame synthesizer generates frequency domain samples for a synthetic frame by interpolating from frequency domain samples in both the previous frame buffer 212 and the next frame buffer 216. In one embodiment of the present invention, the frame synthesizer accesses corresponding samples from both the previous frame buffer 212 and the next frame buffer 216, sums the two samples, and multiplies that sum by 0.5. That interpolation is performed for all paired corresponding samples in the previous frame buffer 212 and the next frame buffer 216. In one embodiment, using a 1,024 frequency transform, 1,024 frequency domain samples will be generated from 1,024 paired samples from the previous frame buffer and the next frame buffer.

In a further step 908, the synthetic frequency domain frame samples generated in the step 906 are placed in the current frame buffer 214. In a step 910, the second decoding stage module 208 decodes the synthetic frequency domain samples into time domain samples which are then placed into the audio output buffer for audio reproduction.

The present invention advantageously uses the presence of certain signal characteristics detected in audio data temporally proximate to lost audio data to influence weighting factors used to construct or recreate the lost audio data.

If, in the step 904, the frame synthesizer determines that at least one of the transient flags is true, then, in a next step 912, the frame synthesizer checks whether both the transient flag associated with the previous frame buffer 212 and the transient flag associated with the next frame buffer 216 are true. If so, then processing resumes in the step 906. If, however, in the step 912, the frame synthesizer determines that at least one of the transient flags associated with the previous frame buffer 212 and the next frame buffer 216 are false, then, in a next step 914, the frame synthesizer checks whether the transient flag associated with the previous frame buffer 212 is true.

If not, then, in a step 918, the frame synthesizer generates a synthetic frame by interpolating from the frequency domain samples in the previous frame buffer 212. Thus, the frame synthesizer advantageously avoids reconstructing the lost audio frame using a contribution from the frequency domain samples in the next frame buffer which appear to represent a transient audio signal.

In one embodiment of the present invention, the frame synthesizer interpolates from the samples in the previous frame buffer 212 by multiplying each by a weight factor of 0.75. This interpolation generally results in a fading from the frame preceding the lost frame. Once each of the samples for the synthetic frame has been generated by the interpolation, then, processing resumes in the step 908 wherein each of those synthetic frame samples is placed in the current frame buffer 214.

If, in the step 914, the transient flag associated with the previous frame buffer 212 is true and the transient flag associated with the next frame buffer 216 is false, then, in a next step 916, the frame synthesizer generates a synthetic frame by interpolating from the frequency domain samples in the next frame buffer 216. In one embodiment of the present invention, each of the frequency domain samples in the next frame buffer 216 is multiplied by a weight factor of 0.75 to generate frequency domain samples for a synthetic frame. When all of the samples have been interpolated, processing resumes in the step 908.

Figure 10:
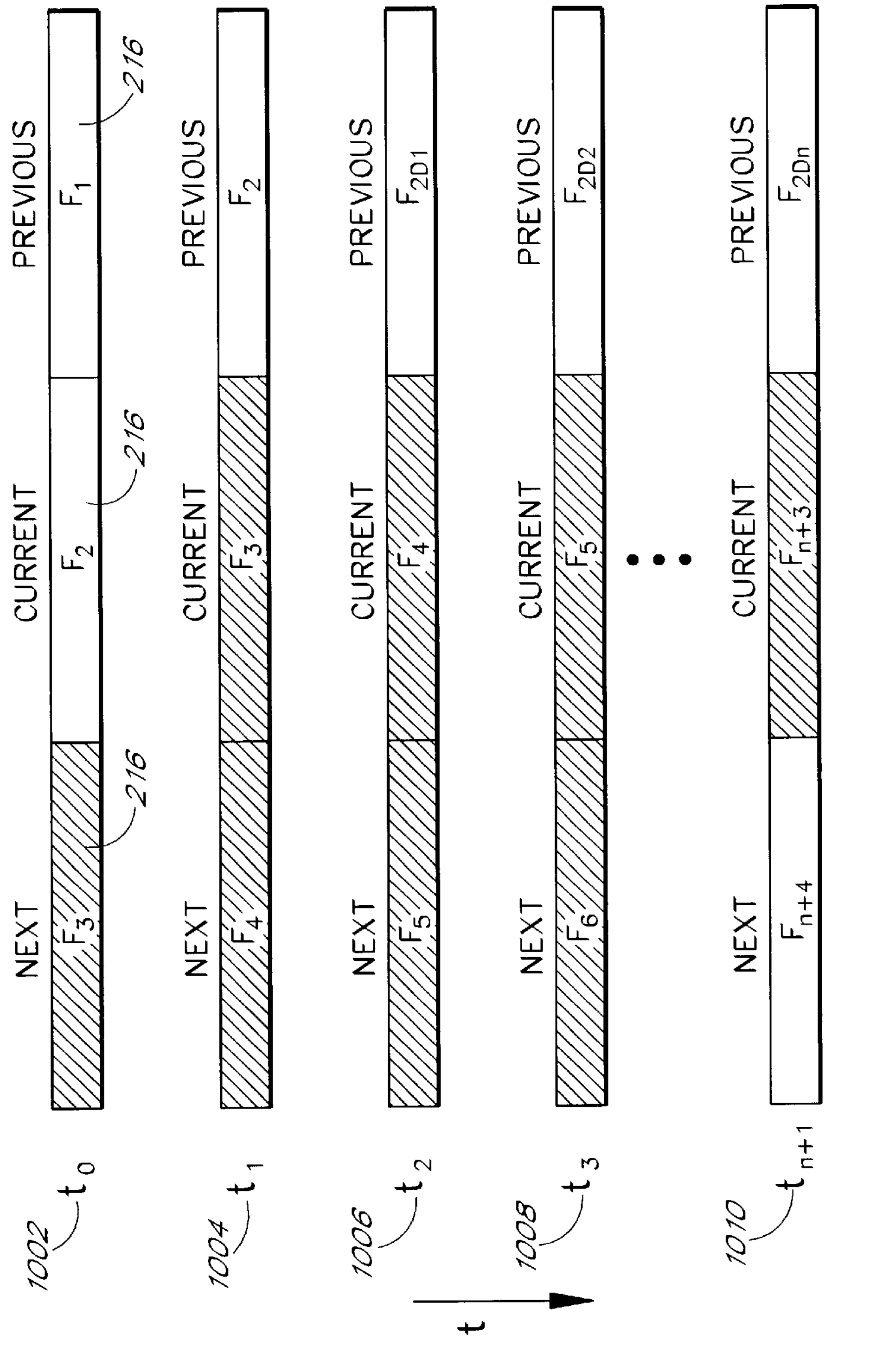
FIG. 10 represents an illustration of progressively decaying interpolated frequency domain samples from a successfully received audio frame when multiple frames of audio data are lost in succession.

Advantageously, when multiple audio data frames are lost, the present invention interpolates frequency domain samples using the frequency domain samples from a last successfully received audio frame and gradually decays the interpolated frequency domain samples until another frame of audio data is successfully received. FIG. 10 represents an illustration of progressively decaying interpolated frequency domain samples from a successfully received audio frame when multiple frames of audio data are lost in succession.

At a time $t_0$ 1002, the previous frame buffer 212 holds frequency domain samples from a successfully received audio frame, the current frame buffer 214 holds frequency domain samples from a successfully received audio frame, and the next frame buffer 216 holds data representing a lost audio frame. At a next time $t_1$ 1004, the successfully received frame data in the current frame buffer are processed in the second decoding stage module 208 (not shown) and also are shifted into the previous frame buffer 212. The lost frame data in the next frame buffer 216 are shifted into the current frame buffer 214, and new data representing a lost frame are placed in the next frame buffer 216. Thus, around the time $t_1$ 1004, there are no frequency domain samples in either the current frame buffer 214 or the next frame buffer 216. The present invention interpolates frequency domain samples from those in the previous frame buffer by applying a 0.75 interpolation weight as described above. Those interpolated frequency domain samples are placed in the current frame buffer 214 and processed by the second decoding stage module 208.

At a next time $t_2$ 1006, the interpolated frequency domain samples, once decayed in accordance with the interpolation weight, are shifted from the current frame buffer 214 to the previous frame buffer 212. The data representing the lost audio frame in the next frame buffer 216 are shifted into the current frame buffer 214, and data representing still another lost audio frame are placed in the next frame buffer 216. Again, the only source of valid frequency domain samples are those in the previous frame buffer 212, now once decayed. The present invention, in one embodiment, applies an interpolation weight of 0.75 to the once decayed frequency domain samples in the previous frame buffer 212 to generate twice decayed frequency domain samples which are placed in the current frame buffer 214. The twice decayed frequency domain samples are processed by the second decoding stage module 208 (not shown).

At a next time $t_3$ 1008, the interpolated frequency domain samples, now twice decayed in accordance with the interpolation weight, are shifted from the current frame buffer 214 to the previous frame buffer 212. The data representing the lost audio frame in the next frame buffer 216 are shifted into the current frame buffer 214, and data representing yet another lost audio frame are placed in the next frame buffer 216. The only source of valid frequency domain samples are again those in the previous frame buffer 212, now twice decayed. The present invention again applies an interpolation weight of 0.75 to the twice decayed frequency domain samples in the previous frame buffer 212 to generate thrice decayed frequency domain samples which are placed in the current frame buffer 214. The thrice decayed frequency domain samples are processed by the second decoding stage module 208 (not shown).

Processing as described in connection with the times $t_2$ and $t_3$ continues until a time $t_{n+1}$ 1010 when a frame of audio data is successfully received. At that time, the possibly many times decayed frequency domain samples in the current frame buffer 214 are shifted into the previous frame buffer 212. The data corresponding to the lost audio frame in the next frame buffer 216 are shifted into the current frame buffer 214, and frequency domain samples representing the recently and successfully received audio frame are placed into the next frame buffer 216.

With frequency domain samples in both the previous frame buffer 212 and the next frame buffer 216, the present invention, in one embodiment, generates synthetic frequency domain samples by interpolating from paired samples from both the previous and next buffers by adding each pair of corresponding samples together and multiplying by an interpolation weight of 0.5. That interpolation combines an equal contribution from each of the paired samples to generate each synthetic sample. Because of progressive decay of the samples in the previous frame buffer, however, those samples may contribute less to each synthetic frequency domain sample, creating, in effect, a quick ramp up to the signals of the new successfully received audio frame. It will be appreciated that the present invention may operate using different interpolation values and that such are essentially a matter of tuning.

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description.

What is claimed is:

1. A method for creating audio signal data representing audio data lost during a transmission, the method comprising the steps:

receiving first audio data from an audio transmission;

receiving second audio data from an audio transmission;

detecting the loss of audio data between said first and second audio data;

determining the presence of a transient audio signal in said first audio data;

decoding said second audio data to create second frequency domain data; and interpolating synthetic frequency domain data by applying an interpolation weight to samples in said second frequency domain data.

2. The method as described in claim 1, comprising the further step of:

decoding said synthetic frequency domain data to generate time domain data for audio reproduction.

3. The method as described in claim 1, comprising the further steps of:

determining the presence of a transient audio signal in said second audio data;

decoding said first audio data to create first frequency domain data; and interpolating synthetic frequency domain data by applying an interpolation weight to samples in said first and second frequency domain data.

4. A method for creating audio signal data representing audio data lost during a transmission, the method comprising the steps:

receiving first audio data from an audio transmission;

receiving second audio data from an audio transmission;

detecting the loss of audio data between said first and second audio data;

determining the presence of a transient audio signal in said first audio data;

decoding said second audio data to create second frequency domain data;

interpolating synthetic frequency domain data by applying an interpolation weight to samples in said second frequency domain data; and wherein said step of determining the presence of a transient audio signal includes parsing a bit stream representing said first audio data.

5. A method for creating audio signal data representing audio data lost during a transmission, the method comprising the steps:

receiving first audio data from an audio transmission;

receiving second audio data from an audio transmission;

detecting the loss of audio data between said first and second audio data;

determining the presence of a transient audio signal in said first audio data;

decoding said second audio data to create second frequency domain data;

interpolating synthetic frequency domain data by applying an interpolation weight to samples in said second frequency domain data;

decoding said first audio data to generate time domain data; and wherein said step of determining the presence of a transient audio signal includes detecting a threshold change in signal energy in time domain data decoded from said first audio data.

6. A system for concealing errors during audio playback caused by lost audio data, the system comprising:

a buffer storing first and second audio data;

an audio loss detector detecting an absence of audio data expected between said first and second audio data;

an audio decoder generating second frequency domain data from said second audio data;

a transient detector for detecting the presence of a transient audio signal in said first audio data; and a frame synthesizer interpolating synthetic audio data to fill said absence by applying an interpolation weight to said second frequency domain data.

7. A system for concealing errors caused by lost audio data in an audio transmission, the system comprising:

means for receiving audio data;

means for detecting lost audio data;

means for decoding received audio data to generate frequency domain data;

means for detecting transient audio signals in received audio data; and means for synthesizing audio frame data from frequency domain data.

8. The method as described in claim 1, wherein the step of determining the presence of a transient audio signal in said first audio data includes detecting a change in transform encoding applied to said first audio data.

9. The method as described in claim 8, wherein said change relates to a size of said transform.

10. The method as described in claim 8, wherein said change relates to a type of said transform.

11. The method as described in claim 1, wherein the step of determining the presence of a transient audio signal in said first audio data includes comparing signal energy levels each representative of a respective segment of said first audio data.

12. The method as described in claim 11, wherein a gradually increasing compensation factor is applied to each signal energy value to compensate for signal energy tapering.

13. The system as described in claim 6, wherein said transient detector detects a change in transform applied to encode said first audio data.

14. The system as described in claim 6, wherein said transient detector generates a plurality of signal energy values each representing a signal energy of a respective segment of said first audio data, and wherein said transient detector compares the differences between signal energy values of successive segments to a predetermined threshold.

15. The system as described in claim 7, wherein synthesized audio frame data includes no data corresponding to a detected transient audio signal.

16. A computer program embodied in a tangible medium when executed by a processor comprises:

receiving first and second audio data from an audio transmission;

detecting a loss of audio data between said first and second audio data;

determining the presence of a transient audio signal in said first audio data;

decoding said second audio data to create second frequency domain data; and interpolating synthetic frequency domain data by applying an interpolation weight to samples in said second frequency domain data.

17. The computer program of claim 16, further comprising:

decoding said synthetic frequency domain data to generate time domain data for audio reproduction.

18. The computer program of claim 16, further comprising:

determining the presence of a transient audio signal in said second audio data;

decoding said first audio data to create first frequency domain data; and interpolating synthetic frequency domain data by applying an interpolation weight to samples in said first and second frequency domain data.

* * * * *